United States Patent
Hwang et al.

(10) Patent No.: US 8,925,569 B2
(45) Date of Patent: Jan. 6, 2015

(54) SAFETY VALVE OF LOW-PRESSURE GAS PIPE

(75) Inventors: Woon Bong Hwang, Pohang (KR); Jeong Hwa Seo, Pohang (KR); Wan Kyun Chung, Pohang (KR); Dong Seob Kim, Daegu (KR)

(73) Assignee: Postech Academy—Industry Foundation, Pohang (KR)

( * ) Notice: Subject to any disclaimer, the term of this patent is extended or adjusted under 35 U.S.C. 154(b) by 316 days.

(21) Appl. No.: 13/505,085

(22) PCT Filed: Nov. 3, 2010

(86) PCT No.: PCT/KR2010/007717
§ 371 (c)(1),
(2), (4) Date: Apr. 30, 2012

(87) PCT Pub. No.: WO2011/055972
PCT Pub. Date: May 12, 2011

(65) Prior Publication Data
US 2012/0216892 A1    Aug. 30, 2012

(30) Foreign Application Priority Data
Nov. 4, 2009 (KR) .................. 10-2009-0106205

(51) Int. Cl.
*F16L 55/07* (2006.01)
*F16K 24/04* (2006.01)
*F16L 55/24* (2006.01)

(52) U.S. Cl.
CPC ............... *F16L 55/07* (2013.01); *F16K 24/044* (2013.01); *F16L 55/24* (2013.01)
USPC ........... 137/202; 137/176; 137/180; 137/197; 137/199; 137/247.41

(58) Field of Classification Search
USPC ......... 137/180, 187, 179, 182, 197, 199, 175, 137/176, 171, 202, 247.41
See application file for complete search history.

(56) References Cited

U.S. PATENT DOCUMENTS

| 403,704 | A | * | 5/1889 | Sinclair | 137/171 |
|---|---|---|---|---|---|
| 3,685,534 | A | * | 8/1972 | Straitz, III | 137/171 |
| 5,192,156 | A | * | 3/1993 | Webb | 404/4 |
| 2007/0144581 | A1 | | 6/2007 | Singh | |

FOREIGN PATENT DOCUMENTS

| BE | 668609 | 12/1965 |
|---|---|---|
| CN | 1225991 | 8/1999 |
| DE | 1114756 | 10/1961 |
| DE | 1130233 | 5/1962 |
| JP | 36-000573 | 1/1961 |

(Continued)

*Primary Examiner* — Craig Schneider
(74) *Attorney, Agent, or Firm* — Lexyoume IP Meister, PLLC

(57) ABSTRACT

Disclosed is a safety valve of a low-pressure gas pipe which can be installed in a large-scale pipeline through which waste gases generated in a large-scale factory such as a steel mill flow and can reduce maintenance/management costs. The safety valve of a low-pressure gas pipe installed in a waste gas pipeline to discharge condensate includes: a first pipeline connected to a bottom surface of the waste gas pipeline and having a waste gas outlet on an inner wall thereof at one side thereof; a second pipeline extending from the first pipeline to be bent and extending in a direction parallel to the first pipeline; and an opening/closing unit for opening or closing the waste gas outlet.

4 Claims, 3 Drawing Sheets

(56) References Cited

FOREIGN PATENT DOCUMENTS

| JP | 54-049618 | 4/1979 |
| JP | 62-251583 | 11/1987 |
| JP | 09-242154 | 9/1997 |
| JP | 2003-056785 | 2/2003 |
| JP | 2006-007899 | 1/2006 |
| KR | 20-0176948 | 4/2000 |
| KR | 20-0181681 | 5/2000 |
| KR | 10-0629440 | 4/2006 |
| KR | 10-2009-0112246 | 5/2011 |
| WO | 0184027 | 11/2001 |

* cited by examiner

SAFETY VALVE OF LOW-PRESSURE GAS PIPE

TECHNICAL FIELD

The present invention relates to a safety valve of a low-pressure gas pipe. More particularly, the present invention relates to a safety valve of a low-pressure gas pipe which can be installed in a large-scale pipeline through which waste gases generated in a large-scale factory such as a steel mill flow and can reduce maintenance/management costs.

BACKGROUND ART

In general, a large amount of waste gases are generated in a process of operating a factory such as a steel mill. Such waste gases may contain various harmful substances, moisture, and oil components. The waste gases may flow along a large-scale pipeline connected to a waste gas treating facility to be treated.

Approximately several thousands of valves for discharging condensate may be connected to the large-scale pipeline through which the waste gases flow. The pipeline is bent such that the condensate produced from the waste gases can be gradually discharged from such condensate discharging valves after stagnating in the pipeline. The condensate discharging valves can regulate a rapid pressure change that may occur in the pipeline through which the waste gases flow.

That is, as shown in FIG. 3, each of the condensate discharging valves may be connected to a bottom surface of a large-scale main waste gas pipeline 101 and may be configured such that the condensate discharging valve is bent upward while facing downward and is in turn bent again downward (this configuration refers to an S trap apparatus which is bent twice generally in an S-like shape such that liquid can always stagnate in the apparatus to prevent reverse flow of gases).

The condensate 105 stagnating in the condensate discharging valve 105 serves to interrupt waste gases which may be leaked to the outside when the waste gases passing through the large-scale pipeline are maintained at an appropriate pressure.

There may occur a local increase of a pressure of gases in the process where the waste gases flow along the large-scale pipeline. In this case, the waste gas pushes the condensate stagnating in the condensate discharging valve to be discharged to the outside. The pressure of the pipeline through which the waste gases pass is regulated through such a process.

In this case, when a large amount of waste gases are continuously discharged to the outside through the condensate discharge valve, there may occur a gas explosion accident or a gas poisoning accident.

The condensate may be discharged by a pressure of the waste gases from the condensate discharging valve from which waste gases are leaked, so the waste gases may be continuously leaked, which requires a prompt waste gas leakage interrupting operation.

When waste gases are leaked, the operators check and find out condensate discharging valves in question and properly introduce water or liquid instead of the discharged condensate to interrupt discharge of waste gases. Thus, costs for managing, maintaining, and repairing a plurality of condensate discharging valves provided in the large-scale pipeline increase, which is disadvantageous.

DISCLOSURE

Technical Problem

The present invention has been made in an effort to provide a safety valve of a low-pressure gas pipe which can reduce maintenance/management costs while maintaining functions of a plurality of condensate discharging valves provided in a large scale waste gas pipeline as they are.

Technical Solution

An exemplary embodiment of the present invention provides a safety valve of a low-pressure gas pipe installed in a waste gas pipeline to discharge condensate, including: a first pipeline connected to a bottom surface of the waste gas pipeline and having a waste gas outlet on an inner wall at one side thereof; a second pipeline extending from the first pipeline to be bent and extending in a direction parallel to the first pipeline; and an opening/closing unit for opening or closing the waste gas outlet.

The opening/closing unit may include: an opening/closing member hingedly coupled to the inner wall of the first pipeline at one side thereof to block the waste gas outlet; a connecting member connected to the opening/closing member; and a float connected to the connecting member to be moved in a direction in which the connecting member opens the waste gas outlet along the first pipeline by a pressure and return to an initial position by a buoyant force of the condensate in the first pipeline.

The connecting member may be a wire, and the connecting member may be formed of a resilient material.

The waste gas outlet may be disposed at a location higher than a water surface of the condensate in the first pipeline.

Advantageous Effects

According to the exemplary embodiment of the present invention, when there occurs a local increase of a pressure of gases in a large-scale waste gas pipeline, a float is moved by the pressure of waste gases so that the waste gases can be discharged through a waste gas outlet which is opened, whereas when a pressure of the waste gases lowers, the float returns to an initial position, interrupting the waste gas outlet so that an appropriate amount of condensate can be always left in a safety valve, eliminating a need for an operator to separately supplement liquid such as water. Accordingly, the number of processes can be reduced and maintenance/management costs can be decreased.

MODE FOR INVENTION

Hereinafter, an exemplary embodiment of the present invention will be described in detail with reference to the accompanying drawings.

Figure 1:
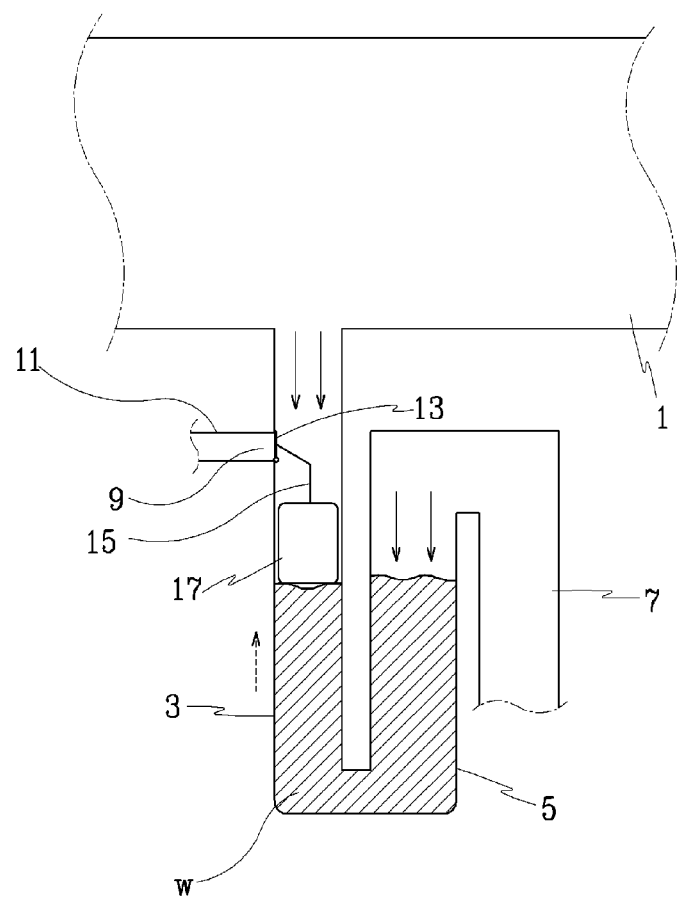
FIG. 1 is a schematic diagram for explaining a safety valve of a low-pressure gas pipe according to an exemplary embodiment of the present invention.

FIG. 1 is a schematic diagram for explaining a safety valve of a low-pressure gas pipe according to an exemplary embodiment of the present invention.

The safety valve of a low-pressure gas pipe is provided on a bottom surface of a waste gas pipeline 1 through which waste gases pass. The safety valve of a low-pressure pipe includes a first pipeline 3 connected to the bottom surface of the waste gas pipeline 1 and through which condensate is introduced to stagnate, a second pipeline 5 extending from the first pipeline 3 to be bent in a U-like shape and then extending in a direction parallel to the first pipeline 3, and a third pipeline 7 extending from the second pipeline 5 to be bent again and extending in a direction parallel to the second pipeline 5.

The safety valve of a low-pressure gas pipe further includes a waste gas outlet 9 provided on an inner wall of the first pipeline 3 at one side thereof, and an opening/closing unit for opening and closing the waste gas outlet 9.

The waste gas outlet 9 is a portion where a discharge pipeline 11 through which waste gases can be discharged is connected to a side surface of the first pipeline 3.

The waste gas outlet 9 may be disposed at a location higher than the water surface of the condensate w in the first pipeline 3. This configuration is adapted to discharge only waste gases through the waste gas outlet 9 while a predetermined amount of condensate is maintained in an interior of the first pipeline 3 when there occurs a temporary local increase of the internal pressure of the waste gas pipeline 1.

The opening/closing unit includes an opening/closing member 13 for blocking the waste gas outlet 9, a connecting member 15 connected to the opening/closing member 13, and a float 17 connected to the connecting member 15.

The opening/closing member 13 may be hingedly coupled to an inner wall of the first pipeline 3 at one side thereof to open or close the waste gas outlet 9. The connecting member 15 is connected to one side of the opening/closing member 13. The connecting member 15 may be a wire or a steel wire and may be disposed to pull or push the opening/closing member 13 in order to open or close the waste gas outlet 9.

The float 17 may be moved upward and downward along an interior of the first pipeline 3. The float 17 is connected to one side of the connecting member 15 to pull or push the connecting member 15 as the float 17 is moved. The float 17 may be moved downward by a pressure of the waste gases and may return to an initial position thereof by a buoyant force when the pressure of the waste gases pipeline 1 remains constant.

That is, the condensate w is filled in the interior of the first pipeline 3 to interrupt the waste gases in the waste gas pipeline 1 from being discharged to the outside. The condensate w provides the float 17 with a buoyant force. Thus, the float 17 can always return to the initial position.

The connecting member 15 may be formed of a resilient material, in which case the connecting member 15 can serve to absorb an excessive movement of the float 17 during the movement of the float 17. That is, when the float 17 continues to be moved upward even after the opening/closing member 13 already closes the waste gas outlet 9, the connecting member 15 having resiliency can be deformed to absorb the movement of the float 17.

An operation of the safety valve according to the exemplary embodiment of the present invention will be described hereinbelow in detail with reference to FIG. 2.

If condensate w is produced from waste gases passing through the waste gas pipeline 1, the condensate w is collected in the first pipeline 3. In this state, if the amount of the condensate w is larger than a predetermined value, the condensate w produced additionally is discharged to the outside through the third pipeline 7 via the second pipeline 5. Thus, the amount of the condensate w is always maintained properly. Accordingly, the waste gases passing through the waste gas pipeline 1 can be introduced into the waste gas treating apparatus while not being leaked to the outside.

Figure 2:
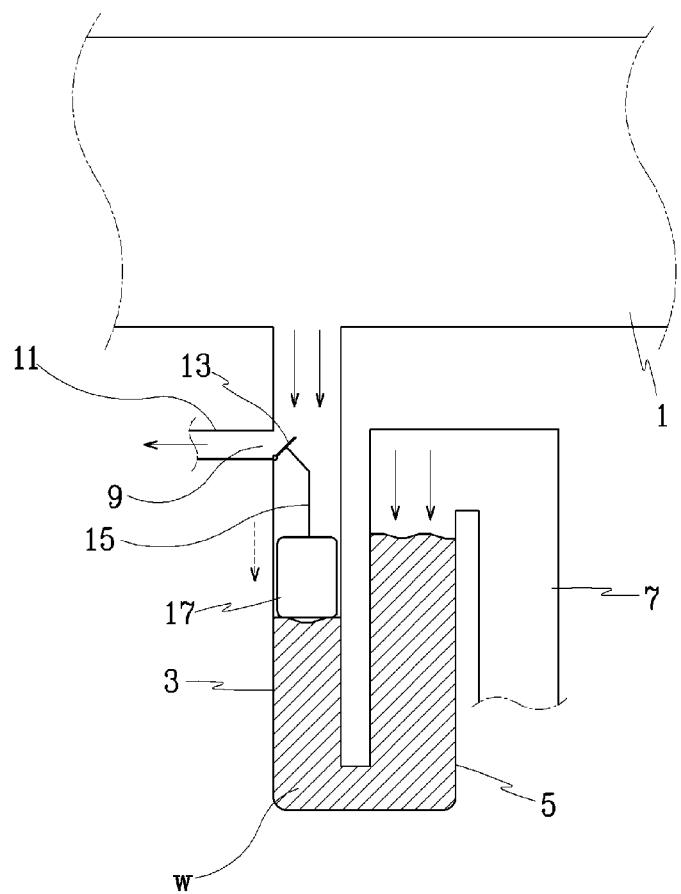
FIG. 2 is a schematic diagram for explaining an operation of the safety valve of FIG. 1.
Figure 3:
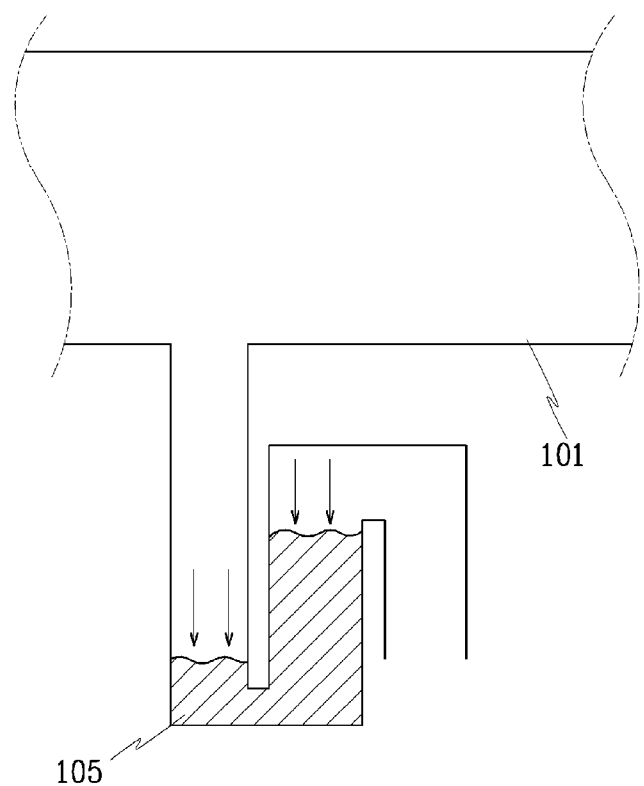
FIG. 3 is a schematic diagram for explaining a safety valve of a low-pressure gas pipe according to the related art.

In this state, if the pressure of the waste gas pipeline 1 locally increases, the pressure of the waste gases is applied to the float 17 so that the float 17 can be moved downward (a direction of a dotted arrow) as shown in FIG. 2.

If the float 17 is moved downward, the connecting member 15 is pulled. The waste gas outlet 9 is opened as the connecting member 15 is pulled and the opening/closing member 13 is pulled. Then, the waste gases in the waste gas pipeline 1 flow to the waste gas discharging pipeline 11 through the waste gas outlet 9. The waste gas discharging pipeline 11 may be connected to a separate treatment apparatus and may extend to the outside.

Of course, in this case, some of the condensate w may be discharged through the second pipeline 5 and the third pipeline 7, but an appropriate amount of condensate w is still left in the first pipeline 3.

Further, if the pressure in the waste gas pipeline 1 is reduced to an appropriate pressure, the water surface of the condensate w in the first pipeline 3 rises again, causing the float 17 to rise due to a buoyant force.

Then, the connecting member 15 is pushed to the initial position. The connecting member 15 pushes the opening/closing member 13 to close the waste gas outlet 9.

Thus, an appropriate amount of condensate w is maintained between the first pipeline 3 and the second pipeline 5 as it is, making it possible to interrupt the waste gases from being continuously discharged from the waste gas pipeline 1.

In addition, in this case, since an appropriate amount of condensate remains between the first pipeline 3 and the second pipeline 5, it is unnecessary for an operator to additionally fill liquid such as water in the first pipeline 3 or the second pipeline 5.

Thus, according to the exemplary embodiment of the present invention, the number of processes required for management of the safety valve can be significantly reduced while the performance of the valve of an existing low-pressure gas pipe is maintained. Accordingly, according to the exemplary embodiment of the present invention, costs for maintaining and managing the condensate valve provided in the waste gas pipe 1 can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A safety valve of a low-pressure gas pipe installed in a waste gas pipeline to discharge condensate, comprising:
    a first pipeline connected to a bottom surface of the waste gas pipeline and having a waste gas outlet on an inner wall thereof at one side thereof;
    a second pipeline extending from the first pipeline to be bent and extending in a direction parallel to the first pipeline; and
    an opening/closing unit for opening or closing the waste gas outlet,
    wherein the opening/closing unit includes:
        an opening/closing member hingedly coupled to the inner wall of the first pipeline at one side of the first pipeline to block the waste gas outlet;

a connecting member connected to the opening/closing member; and a float connected to the connecting member to be moved in a direction in which the connecting member opens the waste gas outlet along the first pipeline by a pressure and return to an initial position by a buoyant force of the condensate in the first pipeline.

2. The safety valve of claim 1, wherein the connecting member is a wire.

3. The safety valve of claim 1, wherein the connecting member is formed of a resilient material.

4. The safety valve of claim 1, wherein the waste gas outlet is disposed at a location higher than a water surface of the condensate in the first pipeline.

* * * * *